(12) United States Patent
Durgin (10) Patent No.: US 9,442,192 B2
(45) Date of Patent: Sep. 13, 2016

(54) METHOD AND APPARATUS FOR LOCATION DETERMINATION USING REFLECTED INTERFEROMETRY

(75) Inventor: Gregory D. Durgin, Atlanta, GA (US)

(73) Assignee: Thingamagigwerks, LLC, Atlanta, GA (US)

( * ) Notice: Subject to any disclaimer, the term of this patent is extended or adjusted under 35 U.S.C. 154(b) by 1708 days.

(21) Appl. No.: 12/505,916

(22) Filed: Jul. 20, 2009

(65) Prior Publication Data

US 2010/0019955 A1 Jan. 28, 2010

Related U.S. Application Data

(60) Provisional application No. 61/083,974, filed on Jul. 28, 2008.

(51) Int. Cl.
| | |
|---|---|
| G01S 13/00 | (2006.01) |
| G01S 13/87 | (2006.01) |
| G01S 13/75 | (2006.01) |
| G01S 13/84 | (2006.01) |

(52) U.S. Cl.
CPC ............ *G01S 13/878* (2013.01); *G01S 13/756* (2013.01); *G01S 13/84* (2013.01)

(58) Field of Classification Search
CPC ..... G01S 13/756; G01S 13/84; G01S 13/878
USPC ........................................ 342/129, 156, 157
See application file for complete search history.

(56) References Cited

U.S. PATENT DOCUMENTS

| | | | |
|---|---|---|---|
| 6,046,683 A | 4/2000 | Pidwerbetsky et al. | |
| 6,181,253 B1 * | 1/2001 | Eschenbach et al. | ..... 340/573.4 |
| 6,261,189 B1 | 7/2001 | Saville et al. | |
| 6,353,406 B1 | 3/2002 | Lanzl et al. | |
| 6,483,427 B1 | 11/2002 | Werb | |
| 6,512,478 B1 | 1/2003 | Chien et al. | |

(Continued)

FOREIGN PATENT DOCUMENTS

| | | |
|---|---|---|
| WO | WO-2011/091347 | 7/2011 |
| WO | WO-2011/091355 | 7/2011 |

OTHER PUBLICATIONS

Griffin, J.D. "A Radio Assay for the Study of Radio Frequency Tag Antenna Performance", Report PG-TR-050504-JDG, Georgia Tech Propagation Group MS Thesis, http://www.propagation.gatech.edu, (2005),.

(Continued)

*Primary Examiner* — Timothy A Brainard
(74) *Attorney, Agent, or Firm* — Philip H. Burrus, IV (57) ABSTRACT

A system (200) and method (400) for determining the location of an object is provided. A plurality of radio transceivers (101,201,203,205) are disposed about a location of interest (221). One or more tags (102) are coupled to an object. The radio transceivers (101,201,203,205) transmit radio frequency signals (115,215,217,219) to the tag (102), which backscatters a return signal (116,216,218,220) having a unique identifier modulated therein due to a switch (108) switching between two or more loads (110,112) in accordance with a unique identification code (118). A location determination module (107) then determines the location of the tag (102) by using a course location estimate (502), a fine location estimate (503), or combinations thereof. A object modeling module (109) can create multidimensional models using the locations of the tags (102).

20 Claims, 7 Drawing Sheets

(56) References Cited

U.S. PATENT DOCUMENTS

| | | | |
|---|---|---|---|
| 6,577,238 B1* | 6/2003 | Whitesmith et al. | 340/572.1 |
| 6,831,603 B2 | 12/2004 | Menache | |
| 6,941,952 B1 | 9/2005 | Rush, III | |
| 6,990,428 B1 | 1/2006 | Kaiser | |
| 7,009,561 B2* | 3/2006 | Menache et al. | 342/463 |
| 7,030,761 B2 | 4/2006 | Bridgelall et al. | |
| 7,119,738 B2 | 10/2006 | Bridgelall et al. | |
| 7,170,412 B2 | 1/2007 | Knox et al. | |
| 7,479,884 B1* | 1/2009 | Fullerton | G01S 13/003 340/572.1 |
| 8,104,324 B2 | 1/2012 | Hennig et al. | |
| 2005/0212660 A1 | 9/2005 | Hansen et al. | |
| 2006/0001525 A1* | 1/2006 | Nitzan | G06K 19/0702 340/10.1 |
| 2006/0267772 A1* | 11/2006 | Knadle et al. | 340/572.4 |
| 2007/0001814 A1 | 1/2007 | Steinke et al. | |
| 2007/0073513 A1 | 3/2007 | Posamentier | |
| 2007/0096873 A1 | 5/2007 | Sadr | |
| 2007/0184852 A1* | 8/2007 | Johnson et al. | 455/456.1 |
| 2007/0257795 A1 | 11/2007 | Overhultz | |
| 2008/0027599 A1* | 1/2008 | Logan et al. | 701/23 |
| 2008/0231448 A1* | 9/2008 | Fowler et al. | 340/572.1 |
| 2011/0179851 A1 | 7/2011 | Mack et al. | |
| 2011/0181418 A1 | 7/2011 | Mack et al. | |
| 2011/0181419 A1 | 7/2011 | Mack et al. | |
| 2011/0181420 A1 | 7/2011 | Mack et al. | |
| 2011/0184319 A1 | 7/2011 | Mack et al. | |
| 2011/0184663 A1 | 7/2011 | Mack et al. | |
| 2012/0143526 A1 | 6/2012 | Benzel et al. | |
| 2012/0172679 A1 | 7/2012 | Logan et al. | |

OTHER PUBLICATIONS

Griffin, J.D. et al., "Radio Link Budgets for 915 MHzRFID Antennas Placed on Various Objects", *WCNG Wireless Symposium '05* (invited paper), Austin TX, (2005),.

Intellione, "Intellione Home Page", *IntelliOne Traffic Location technology*. Atlanta, GA. http://www.intellione.com/, (2009),.

Pirkl, R. "A Sliding Correlator Channel Sounder for Ultrawideband Measurements", *Georgia Tech MSEE Thesis*, May 2007. http://www.propagation.gatech.edu/Archive/PG_TR_070510_RJP/PG_TR_070510_RJP.pdf, (May 2007),.

Prothro, J. "Improved Performance of a Radio Frequency Identification Tag Antenna on a Metal Ground Plane", *Georgia Tech MSEE Thesis*, May 2007. http://www.propagation.gatech.edu/Archive/PG_TR_070515_JTP/PG_TR_070515_JTP.pdf, (May 2007),.

Rohatg, A. "RFID Anti-Collision System Using the Spread Spectrum Technique", *Undergraduate Thesis*, May 2005. http://www.propagation.gatech.edu/Archive/PG_TR_050425_AR/PG_TR_050425_AR.pdf, (May 2005),.

Rohatgi, A. "Implementation and Applications of an Anti-Collision Differential-Offset Spread Spectrum RFID System", *Georgia Tech MSEE Thesis*, Aug. 2008. http://www.propagation.gatech.edu/Archive/PG_TR_060823_AR/PG_TR_060823_AR.pdf, (Aug. 2008),.

Patwari, N. et al., "Relative Location Estimation in Wireless Sensor Networks", *IEEE Transactions on Signal Processing*, vol. 51, No. 8, pp. 2137-2148, Aug. 2003. http://dx.doi.org/10.1109/TSP.2003.814469, (Aug. 2003),.

Yamamoto, R. et al., "Position Location Technologies Using Signal Strength in Cellular Systems", *IEEE VTS 53rd Vehicular Technology Conference*, Spring 2001. Proceedings (Cat. No. 01CH37202), vol. vol. 4, pp. 2570-2574, 2001. http://dx.doi.org/10.1109/VETECS.2001.944065, (2001),.

Zhu, J. "Indoor/Outdoor Location of Cellular Handsets Based on Received Signal Strength", *Georgia Tech PhD Dissertation*, Jun. 2006. http://www.propagation.gatech.edu/Archive/PG_TR_060515_JZ/PG_TR_060515_JZ.pdf, (Jun. 2006),.

"Publication", "For study of concussions, Stanford athletes use high-tech mouthpiece to record head impact"; Published by Stanford School of Medline; http://med.standford.edu/ism/2011/october/mouthpiece.html; Published Oct. 5, 2011.

"X2 Solution Publication", "The X2IMPACT Solution"; http://www.x2impact.com/X2IMPACT/X2_SOLUTION.html; Published 2011.

Brainard, Timothy "NonFinal OA", U.S. Appl. No. 13/588,663, filed Aug. 17, 2012; Mailed Mar. 20, 2015,.

* cited by examiner

METHOD AND APPARATUS FOR LOCATION DETERMINATION USING REFLECTED INTERFEROMETRY

CROSS REFERENCE TO PRIOR APPLICATIONS

This application claims priority and benefit under 35 U.S.C. §119(e) from U.S. Provisional Application No. 61/083,974, filed Jul. 28, 2008.

BACKGROUND

1. Technical Field

This invention relates generally to location determination using radio frequency devices, and more particularly to a method and apparatus for determining location of a radio frequency identifiable tag using reflected interferometry.

2. Background Art

Radio waves are commonly used with electronic transceivers built into miniaturized "tags" to identify objects. This practice is commonly known as "radio-frequency identification," or "RFID," and is often used in industry to determine the identity of a package or container of goods. For example, in supply chain management systems, a worker may use a handheld, electronic RFID "reader" to transmit a radio frequency signal at a package, crate, or shipping container. When the RFID tag receives the radio wave, electronic circuitry in the tag transmits a return radio wave that includes identification information. When the reader receives the return wave, by comparing the identification information to a database, the reader can deliver the database information corresponding to the package, crate, or shipping container to the reader.

One problem associated with many prior art RFID systems is that they require "line of sight" communication with the tag. Said differently, the worker must be able to see the tag and aim the reader directly at the tag for the radio waves to be received by the tag and reader respectively. Where, for example, a worker stands on the right side of a crate and the tag is affixed on the left side of the crate, the worker may not be able to read the tag without physically walking around the crate. Additionally, it can be advantageous in some applications to know the location of a tag in addition to its identity. Such line of sight systems are less than ideal for location determination.

A further problem with prior art solutions is that they tend to be application specific solutions. For example, certain tags only work with certain readers. Additionally, many readers are only capable of reading signals that are transmitted from the tag in response to the initial wave sent by the reader. Also, while a reader may be capable of cross-referencing identification data with a database, it may not be able to determine an accurate location of the tag. Such location determination may be important in some applications. Many prior art systems also rely on complex electronic circuits in tags that draw high amounts of current from a battery, thereby reducing the functional livelihood of the system.

There is thus a need for an improved radio-frequency system capable of efficiently and accurately determining the location of one or more tags in addition to their identity.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to location determination using one or more tags and reflected interferometry transceivers to determine the location of an object in free space. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of location determination by reflected interferometry as described herein. The non-processor circuits may include, but are not limited to, a radio receiver, a radio transmitter, signal drivers, clock circuits, power source circuits, and user input devices. As such, the functions described herein may be interpreted as steps of a method to perform reflected interferometry location determination. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the invention employ reflected interferometry to determine, in an efficient and accurate manner, the location of a tag in free space. When multiple tags are used, embodiments of the invention facilitate the three-dimensional modeling of an object by determining the relative locations of each tag. By placing one or more radio transceivers about an area of interest, embodiments of the invention make it possible to determine the location and identity of one or more tags disposed within the location of interest by using a received signal phase shift measurement, a signal strength measurement, or a combination of the two. An accurate location of many hundreds of tags can be determined with embodiments of the invention. As described herein, each tag can be configured as an efficient, low-powered sensor capable of modulating an identifier into signals transmitted by any of the transceivers. Embodiments of the present invention are very robust, and even resist signal degradations introduced in the area of interest by multi-path scattering by using backscatter from each tag.

In one embodiment, the system is configured to determine two location estimates of each tag—a coarse location estimate and a fine location estimate. The course location estimate may have an accuracy of around 0.5 meters, while the fine location estimate may have an accuracy of less than a centimeter. In some embodiments, only one location estimate may be used. For instance, in some applications, a coarse location estimate is all that is required. As the coarse location estimate can generally be determined more quickly, there may be no need to perform the fine location estimate. Conversely, some applications may have no interest in a coarse location estimate, and may instead use only the fine location estimate.

The coarse location estimate, in one embodiment, can be determined from the difference in signal strength between the signal transmitted from the transceiver and the signal received from the tag. The fine location estimate, in one embodiment, can be determined from the phase shift present between a signal transmitted from the transceiver and the signal received from the tag. Embodiments of the present invention offer advantages over prior art systems in that backscattered signals are measured by the transceivers rather than traditional "line of sight" transmitter-to-receiver signals. Another advantage offered by embodiments of the present invention is both coarse and fine location estimates may be made from the same backscattered signals—there is no need to use one signal type and measurement algorithm for one type of location estimation, while using another signal type and measurement algorithm for another type of location estimation. Both course and fine location estimates can be made from the same backscattered radio waveform. Exemplary waveforms suitable for use with embodiments of the invention include those within the UHF and microwave spectra.

Another advantage offered by embodiments of the present invention is that the tags can be scaled down to very small physical form factors. In one embodiment, the physical form factor of a tag can be made comparable in size to a US one-cent coin. Further, these tags are inexpensive to manufacture, and draw a small enough current from an on-board battery as to function continuously for many years. Such a small form factor, inexpensive cost, and efficient operation allows many tags to be used in a small area of interest, such as just a few square meters. Consequently, very accurate models of objects to which the tags are coupled can be obtained as well. Additionally, as backscattered signals are used, the area of interest can be scaled up to hundreds of meters with very little degradation in accuracy measurements. Exemplary applications for embodiments of the invention include biomechanical monitoring and motion sensing, shipyard, rail, and air inventory identification and location determination, supply chain management and warehousing operations, and agricultural sensor telemetry.

Figure 1:
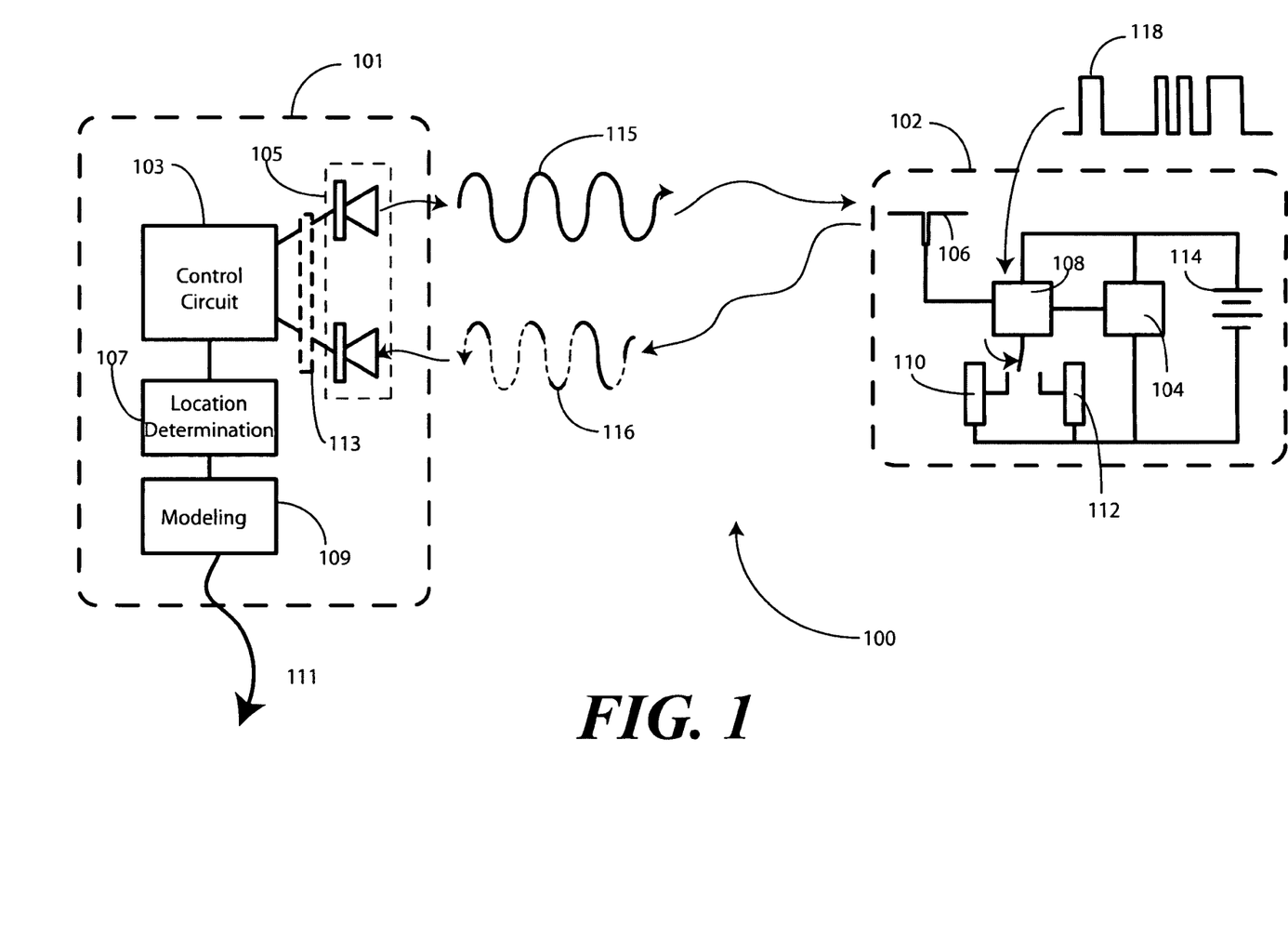
FIG. 1 illustrates one reflected interferometry system for determining a location of an object in free space in accordance with embodiments of the invention.

Turning now to FIG. 1, illustrated therein is one embodiment of a radio interferometry system 100 in accordance with embodiments of the invention. In this illustrative system 100, a radio transceiver 101 and a tag 102 are shown. The illustrative radio transceiver 101 includes a control circuit 103 and a transceiver 105. The illustrative tag 102 includes a controller 104, an antenna 106, and a switch 108 that is responsive to the controller 104. The switch 108 is operative to change a radar cross section of the antenna 106 by selectively altering a load impedance of the antenna 106. In the illustrative embodiment of FIG. 1, the switch 108 does this by selectively switching between two loads 110, 112 coupled to the antenna 106. The first load 110 is a high impedance, so as to resemble a substantially open circuit, while the second load 112 is a low impedance configured to resemble a substantially short circuit. An on-board battery 114, such as a small lithium-ion or lithium-polymer battery suitable for use in wristwatches, provides power for the controller 104 and the switch 108.

Examples of the controller 104 disposed in the tag 102 and control circuit 103 coupled to the transceiver 105 include a microprocessor configured to execute instructions stored in an on-board or separately coupled memory. Alternatively, each of the controller 104 and control circuit 103 can be configured as programmable logic, an ASIC, or combinations thereof. The radio transceiver 101 can even be configured such that the control circuit 103 is disposed in a portable computer or other electronic control device that is electrically coupled with the transceiver 105. In at least some instances, the controller 104 and control circuit 103 will be implemented using one or more microprocessors, implemented to execute one or more sets of pre-stored instructions. However in some instances all or portions of the controller could be implemented in hardware, where exemplary forms include one or more sequential state machines and/or various logic circuitry, including discrete logic elements, programmable gate array elements, or VLSI circuitry. It will be obvious to those of ordinary skill in the art having the benefit of this disclosure that other alternative implementations involving various forms of software programming and hardware elements can be used to implement embodiments of the present invention without departing from the teachings herein.

The transceiver 105 of the radio transceiver 101 is responsive to the control circuit 103 and is configured to transmit a radio frequency signal 115. Where multiple radio transceivers are used in an application, the radio frequency signal 115 transmitted by each radio transceiver may be unique. For example, in one embodiment, each radio frequency signal 115 transmitted may be offset from the others by a predetermined phase. In another embodiment, each radio frequency signal 115 transmitted may have a different frequency or characteristic waveform. In one embodiment, the transmitted radio frequency signal 115 has a center frequency of about 915 MHz, about 2.45 GHz, or about 5.7 GHz. These frequencies are well suited to embodiments of the invention in that they represent the unlicensed scientific and medical bands of 915 MHz, 2.45 GHz, and 5.7 GHz, respectively, having wavelengths of 30 centimeters, 12 centimeters, and 5 centimeters respectively. It will be clear to those of ordinary skill in the art having the benefit of this disclosure, however, that embodiments of the present invention are not limited to these frequencies, as any number of radio frequency bands may work as well.

The tag 102 receives this radio frequency signal 115 at its antenna 106. In one embodiment, the antenna 106 comprises a slot antenna suitable for receiving radio frequency communication. The switch 108 of the tag 102 then, in response to a control signal from the controller 104, switches in accordance with a unique identification code 118 between the two loads 110,112, thereby changing the radar cross section of the antenna 106. This change in radar cross section serves to modulate or encode the unique identification code 118 into a reflected return signal 116 that is backscattered from the antenna 106. The transceiver 105 then receives this backscattered return signal 116 having the unique identifier modulated therein. By reading the unique identifier, the control circuit 103 is able to determine from which tag the backscattered return signal 116 was reflected or backscattered.

A location determination module 107, which may be configured in software as executable code or in hardware as programmable logic, is then configured to compare the received backscattered return signal 116 with the transmitted radio frequency signal 115 to make location determination estimates. In one embodiment, the location determination module 107 is configured to determine the location of the tag by determining a phase shift between the transmitted radio frequency signal 115 and the backscattered return signal 116 to determine a distance between the tag 102 and the radio transceiver 101. In another embodiment, the location determination module 107 is configured to determine a signal strength of the backscattered return signal 116 and compare it with the signal strength of the transmitted radio frequency signal 115 to determine a distance between the tag 102 and the radio transceiver 101. Where multiple radio transceivers are disposed about the area of interest, these distances can be used in a triangulation method to determine a location estimation of each tag.

In one embodiment, as noted above, the location determination module 107 is configured to determine both a first location determination and a second location determination. The first location determination can be a coarse location estimate, while the second location determination can be a fine location estimate. Each location determination can be made using the same backscattered return signals 116. For example, presuming three or more radio transceivers are disposed about an area of interest, in one embodiment the first location determination can be made by triangulating distances from the three or more radio transceivers using the signal strength of each backscattered return signal received by each radio transceiver. In one embodiment, the second location determination can be made by triangulating distances from the three or more radio transceivers using the phase shift between transmitted radio frequency signals and the backscattered return signals received by each radio transceiver.

Where multiple radio transceivers are used, the corresponding control circuits can be combined into a single control circuit or may otherwise be integrated into a single device. For example, each radio transceiver 101 may include an output 111 suitable for coupling to a general purpose computer, application specific device, or user interface.

Where multiple radio transceivers 101 are used to determine the location of any one tag 102, in one embodiment each radio transceiver 101 is capable of receiving a backscattered return signal 116 from each other radio transceiver. Said differently, while radio transceiver 101 may emit its own, unique radio frequency signal 115, it may receive backscattered return signals from multiple other radio transceivers. This configuration can have advantages in some applications, as advanced location determination techniques can be applied to the plurality of received signals.

In other applications, however, it may be desirable to only receive a return signal that corresponds to the signal delivered from the transceiver 105. One way to accomplish this is by including an optional filter 113 configured to pass some backscattered return signals while blocking others. For example, where each radio transceiver transmits a radio frequency signal of a different frequency, the radio transceiver 101 can be equipped with the optional filter such that only the backscattered return signal 116 having the unique identifier modulated therein that corresponds to the radio frequency signal 115 transmitted by radio transceiver 101 will be received, as other backscattered return signals will be blocked.

In another embodiment, such as to reduce multipath distortion, the optional filter 113 can be configured to block signals that are unmodulated, while passing those that have been modulated by the tag 102. Such a filter 113 helps to reduce both noise and distortion that can affect location determination.

Where multiple radio transceivers are used, and further where multiple tags are used, one or more of the radio transceivers may include an optional object modeling module 109. The object modeling module 109 may be configured in software as executable code or in hardware as programmable logic. While shown in FIG. 1 as being incorporated into one of the radio transceivers 101, the object modeling module 109 may be separate from each of the radio transceivers. Additionally, the object modeling module 109 may be a component disposed in a general purpose computer or application specific device that is coupled to one or more of the radio transceivers via the output 111.

In one embodiment, the object modeling module 109 is configured to model a multi-dimensional shape of an object. Presuming that a plurality of tags is disposed along the surface of the object, the object modeling module 109 can map the shape of the object from the determined location of each tag, using an interpolation algorithm to create surfaces between the location of each tag. For example, in one embodiment, the object modeling module 109 can map the shape of the object by linearly connecting the locations of each tag. In another embodiment, a higher order function may be used to connect the tag locations to form the multidimensional shape of the object.

Figure 2:
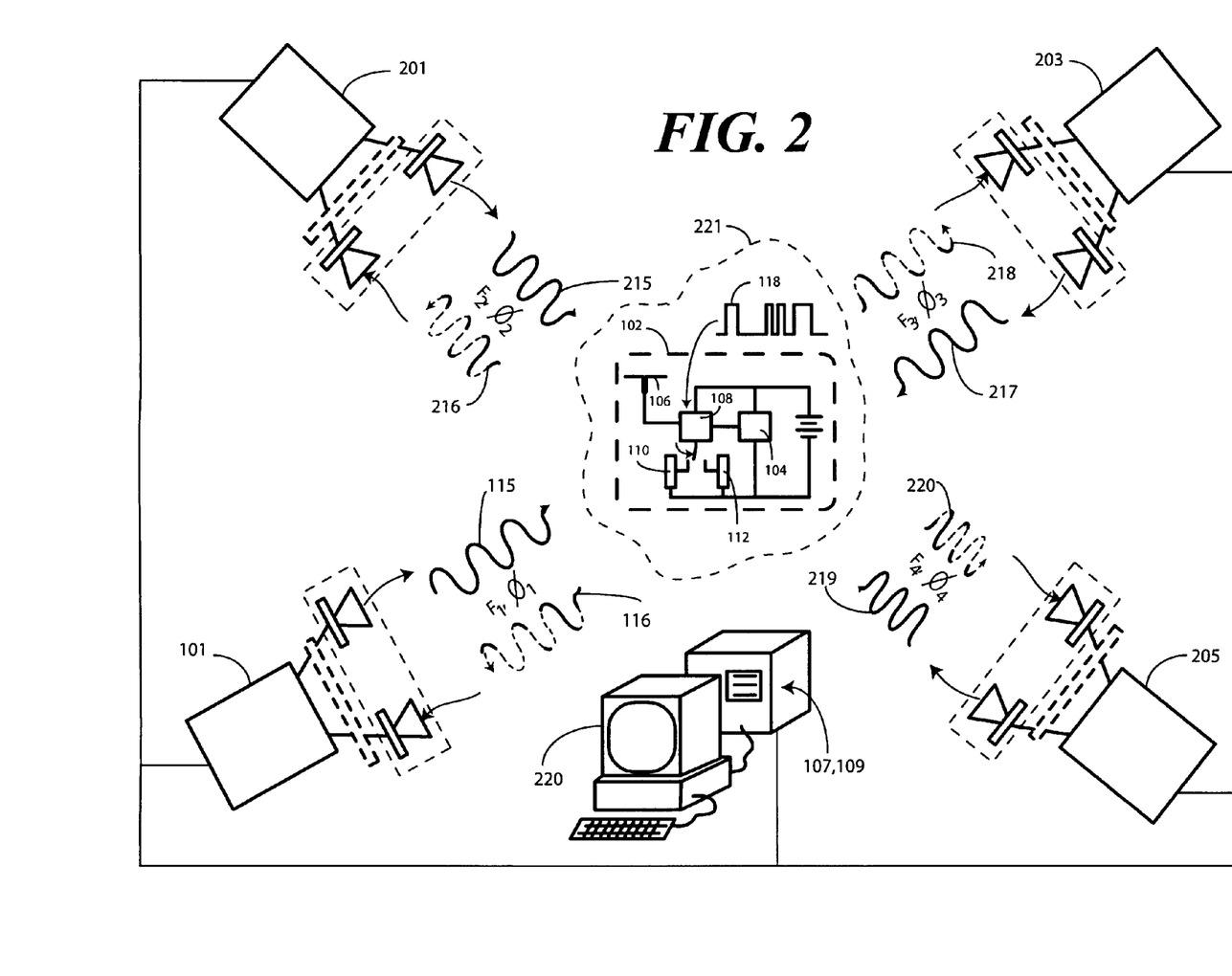
FIG. 2 illustrates another reflected interferometry system in accordance with embodiments of the invention.

Turning now to FIG. 2, illustrated therein is one embodiment of a reflected interferometry system 200 employing multiple radio transceivers 101, 201, 203, 205 to determine the location of one or more tags 102 in free space. In the illustrative embodiment of FIG. 2, there are four radio transceivers 101, 201, 203, 205. While three radio transceivers can be used, many applications will benefit from at least four radio transceivers where relatively accurate course location estimates are desired. Further, the use of more radio transceivers tends to make the overall system 200 more resistant to multiple signal paths and blockage. This is true because the power and phase measurements described above are made from modulated reflections from the tag 102. As such, much of the multipath distortion received by a radio transceiver can be filtered out—since it is unmodulated—by the optional filter (113). Further, adding additional radio transceivers provide redundancy such that the location determinations can be made even when one radio transceiver fails to receive a signal.

In the illustrative embodiment of FIG. 2, the radio transceivers 101, 201, 203, 205 are disposed about a location of interest 221. In one embodiment, each radio transceiver 101, 201, 203, 205 includes a transmitter that is separate and distinct from a receiver. The transmitter of each radio transceiver 101, 201, 203, 205 can be configured to transmit a radio frequency signal 115, 215, 217, 219. In one embodiment, the radio frequency signals 115, 215, 217, 219 are transmitted continuously while location determination is occurring.

As also noted above, in one embodiment each radio frequency signal 115, 215, 217, 219 is unique. For example, each radio frequency signal 115, 215, 217, 219 may have its phase or frequency offset from each of the other radio frequency signals as indicated in FIG. 2.

The tag 102 of the present invention is unique, in that it backscatters each of the radio frequency signals 115, 215, 217, 219 by switching between two loads 110,112 coupled to the antenna 106. This tag 102 is inexpensive to manufacture in that it does not require any RF components such as matching circuits, transmission lines, and the like. Its largest component is generally the antenna 106. However, the antenna 106 merely receives and reflects incident power from each radio frequency signal 115, 215, 217, 219, thereby modulating a unique identifier associated with the tag 102 into the backscattered return signals 116, 216, 218, 220. The physical form factor of the antenna 106 is scalable with frequency. Experimental testing has shown that a 5.7 GHz antenna can be manufactured to be 2 centimeters or less in length.

In the illustrative embodiment of FIG. 2, the controller 104 of the tag 102 is configured to continually cause the switch 108 to switch between at least two loads 110,112 in accordance with a unique identification code 118. This continuous switching accordingly changes the radar cross section of the antenna 106 of the tag in accordance with the unique identification code 118. As such, when each radio frequency signal 115, 215, 217, 219 is received by the antenna 106, it is backscattered as a plurality of return signals 116, 216, 218, 220 to the radio transceivers 101, 201, 203, 205. Each backscattered return signal 116, 216, 218, 220 has the unique identifier of the tag 102 modulated therein, thereby allowing each radio transceiver 101, 201, 203, 205 to identify from which tag it was sent, even where there are numerous tags in the location of interest 221 or field of view. Research suggests that as many as 256 different sensors or more can be disposed within the location of interest 221 without degrading system performance.

In the illustrative embodiment of FIG. 2, each radio transceiver 101, 201, 203, 205 is coupled to a computer 222 having some components the location determination module 107 operational therein. Other components of the location determination module 107 are operational in each of the radio transceivers 101, 201, 203, 205. The location determination module 107 knows the locations of the radio transceivers 101, 201, 203, 205 accurately. In the illustrative embodiment of FIG. 2, the computer 222 also has the optional object modeling module 109 operating therein.

Upon reflection, each backscattered return signal 116, 216, 218, 220 travels to the receiver of each radio transceiver 101, 201, 203, 205. When each radio transceiver 101, 201, 203, 205 receives each backscattered return signal 116, 216, 218, 220, components of the location determination module 107 operating in each radio transceiver 101, 201, 203, 205 may determine a distance between the radio transceiver and the tag 102. As noted above, this can be done in various ways.

Figure 3:
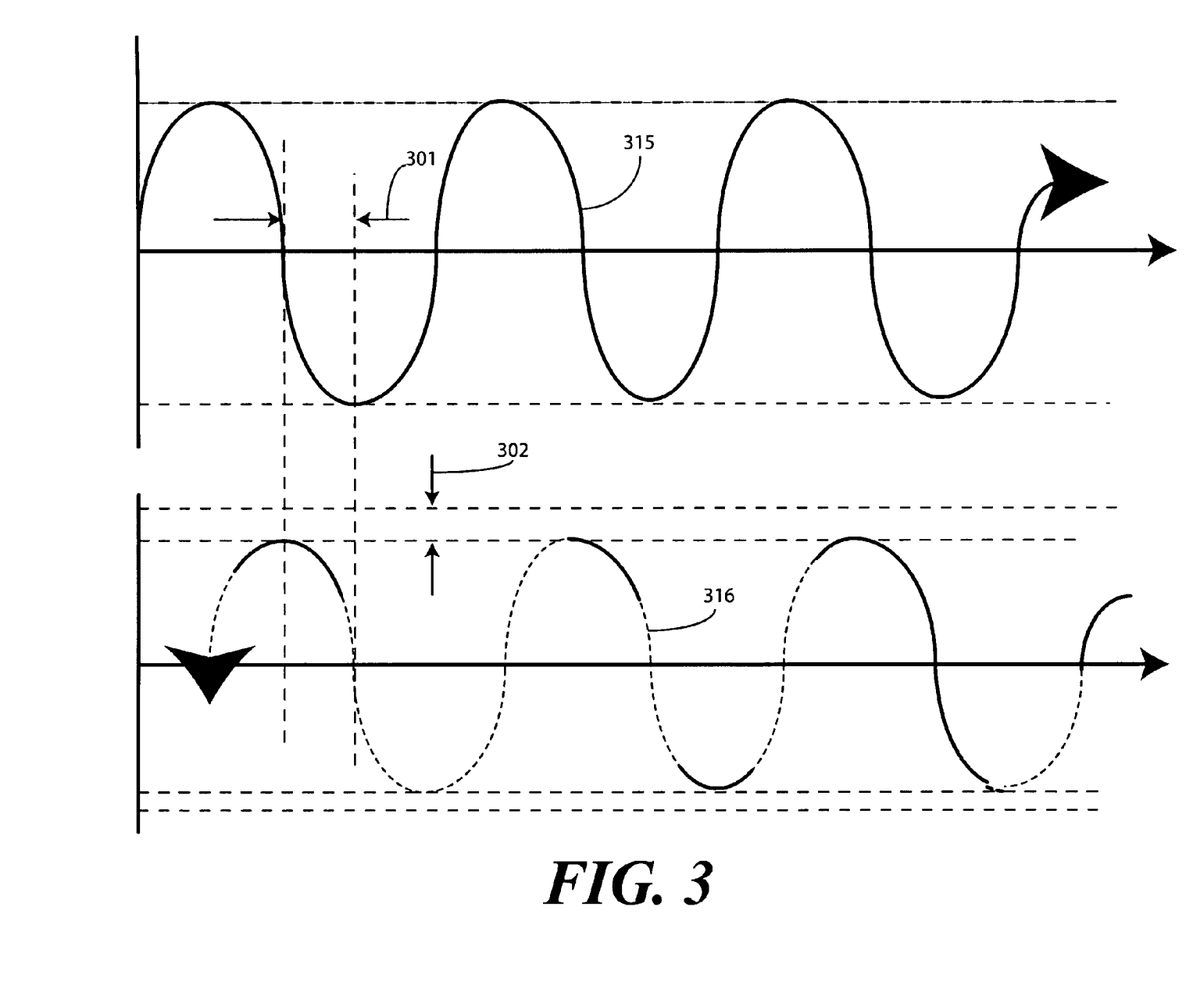
FIG. 3 illustrates exemplary waveforms suitable for use with one or more reflected interferometry systems in accordance with embodiments of the invention.

Turning now briefly to FIG. 3, in one embodiment, the location determination module (107) can determine the distance by determining a phase shift 301 between the transmitted radio frequency signal 315 and the corresponding received backscattered return signal 316. In another embodiment, the location determination module (107) can determine the distance by determining a signal strength 302 of the backscattered return signal 316. Of course, as noted above, combinations of the two approaches can be used.

Turning now back to FIG. 2, in this illustrative embodiment the distance measurement determinations can then be delivered to the components of the location determination module 107 operating in the computer 222. Those components can then determine the location of the tag 102 by triangulating the distances received from each radio transceiver 101, 201, 203, 205. As noted above, the triangulation can be performed by using the signal strength of each backscattered return signal 116, 216, 218, 220, or by using the phase shift between the transmitted radio frequency signals 115, 215, 217, 219 and the backscattered return signals 116, 216, 218, 220. In one embodiment, the components of the location determination module 107 operating in the computer are capable of determining a first location determination, which is a course estimate, using signal strength. The components are also capable of determining a second location determination, which is a fine estimate, using phase.

In one embodiment, the first location determination is based upon received signal strength finger-printing technology. Radio transceivers 101, 201, 203, 205 that are closer to the tag 102 receive stronger signals, while more distant radio transceivers 101, 201, 203, 205 receive weaker signals. Each tag 102 has a unique combination of signal strengths that can be used to provide the location estimate. Further, the backscatter link is lossier than conventional free-space wireless links. The additional propagation loss can be used it increase accuracy determination when the signals are triangulated. Such technology is known in the art and has been used, for example, in cellular communication systems to determine the location of a caller dialing 911. Such technology is illustratively set forth in a paper by N. Patwari, A. Hero III, M. Perkins, N. Correal, and R. O'Dea, entitled "Relative Location Estimation in Wireless Sensor Networks," IEEE Transactions on Signal Processing, vol. 51, no. 8, pp.

2137-48, August 2003, http://dx.doi.org/10.1109/TSP.2003.814469, which is incorporated herein by reference. Location determination based upon signal strength measurements is also illustratively described in a paper by R. Yamamoto, H. Matsutani, H. Matsuki, T. Oono, and H. Ohtsuka, entitled "Position Location Technologies Using Signal Strength in Cellular Systems," IEEE VTS 53rd Vehicular Technology Conference, Spring, 2001. Proceedings (Cat. No. 01CH37202), vol. 4, pp. 2570-4, 2001, http://dx.doi.org/10.1109/VETECS.2001.944065, and a paper by J. Zhu, "Indoor/Outdoor Location of Cellular Handsets Based on Received Signal Strength," Georgia Tech PhD Dissertation, June 2006, http://www.propagation.gatech.edu/Archive/PG_TR_060515_JZ/PG_TR_060515_JZ.pdf, both of which are incorporated herein by reference. The system 200 of FIG. 2 offers advantages over the prior art in that multi-path return signals and free-space blockages do not degrade system performance.

A second, more accurate location estimate can be achieved using phase shift between the transmitted radio frequency signals 115, 215, 217, 219 and the backscattered return signals 116, 216, 218, 220. Each radio transceiver 101, 201, 203, 205 has a corresponding signal path defined between it and the tag 102. The path from each radio transceiver 101, 201, 203, 205 to the tag will introduce a phase change in the transmitted and backscattered wave that is proportional to the total path link. For example, if the signal path from radio transceiver to tag is 5.83 meters, and the radio frequency being used is 5.7 GHz, 3 centimeters of phase difference will be introduced into as the wave travels from the radio transceiver to the tag. This corresponds to a phase difference of 144 degrees. A corresponding amount of phase difference will be introduced on the return trip. Thus, each radio transceiver 101, 201, 203, 205 will measure a different amount of phase shift due to the location of the tag 102.

Figure 8:
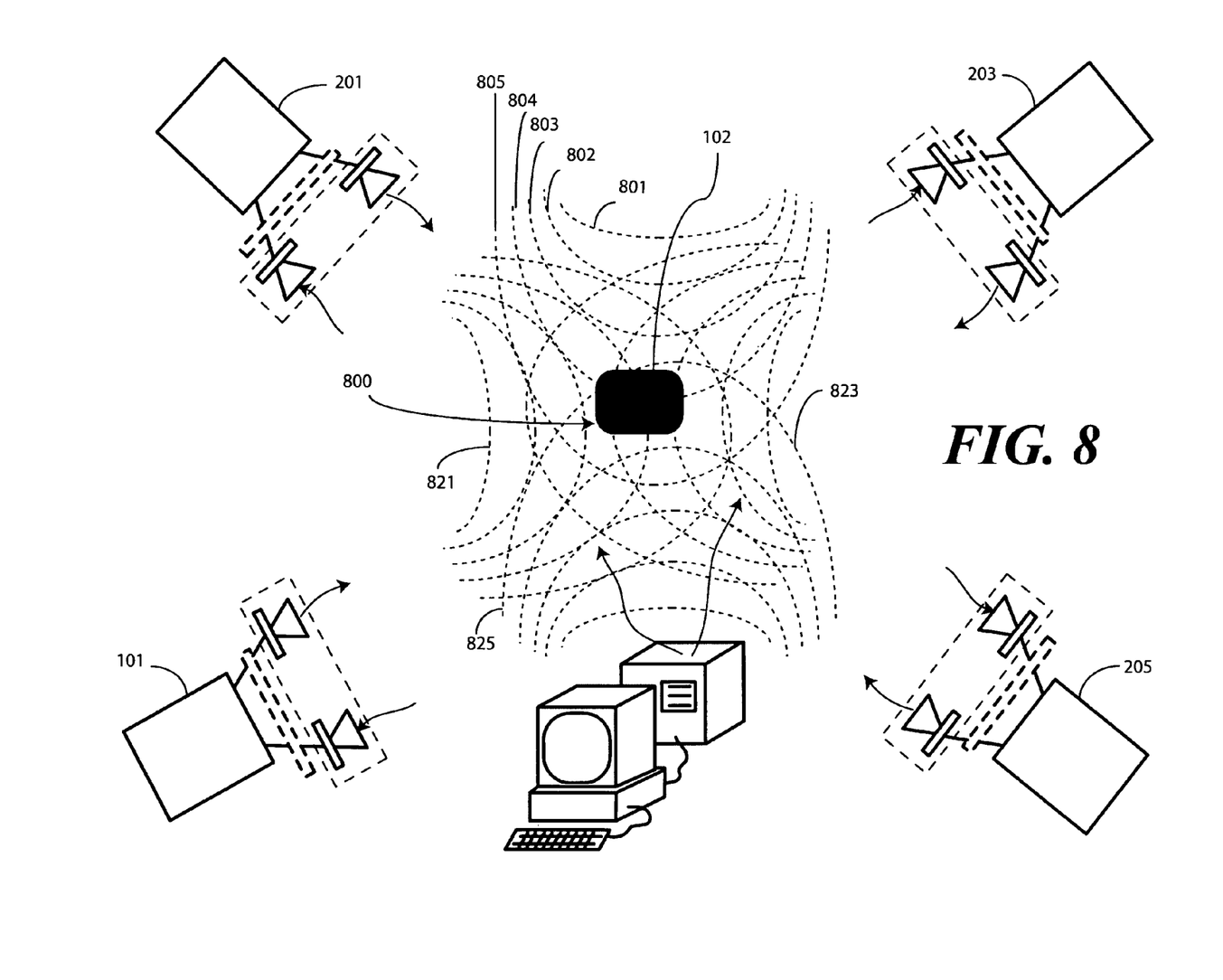
FIG. 8 illustrates one embodiment of hyperbolic surface modeling suitable for use with embodiments of the invention.

Turning briefly to FIG. 8, in one embodiment the location determination module 107 can use the determine phase shift to determine the location of the tag 102 by modeling a series of hyperboloids 801,802,803,804,805 that correspond to a signal path associated with the measured phase difference. As each radio transceiver 101, 201, 203, 205 has a series of hyperboloids, e.g., hyperboloids 801,801,803,805, corresponding thereto, the intersection 800 of each indicates the location of the tag 102.

To illustrate by way of example, a phase difference measurement at 5.7 GHz at 72 degrees would yield a hyperbolic surface in three dimensions that is indicative of a total path length change of 4.36 meters from radio transceiver to tag. Neighboring hyperbolic surfaces would correspond to total path lengths of 4.31 meters and 4.41 meters, respectively.

Location of the tag 102 can then be resolved by using multiple phase measurements from the multiple backscattered return signal measurements. Each phase measurement results in a series of hyperbolic surfaces that can be intersected with others to eventually produce a reliable and sufficiently accurate location estimation of the tag 102.

Using the four-radio transceiver system shown in FIGS. 2 and 10, the phase change between radio transceiver 101 and radio transceiver 205 may be modeled as a set of hyperboloids 825. When intersected with hyperboloids 823 modeling the phase change between radio transceiver 203 and radio transceiver 205, the location of the tag 102 can be narrowed to a set of lines in three-dimensional space, or a set of points in two-dimensional space. When further intersections are made with the hyperboloids 821 modeling the phase change between radio transceiver 101 and radio transceiver 201, the location of the tag 102 is narrowed to a series of points in three-dimensional space, or to a specific point in two-dimensional space. In three-dimensional space, a fourth set of hyperboloids modeling the phase change between radio transceiver 201 and radio transceiver 203 pinpoints the location of the tag 102. Additional radio transceivers may be used for redundancy or reliability.

Turning back to FIG. 2, in one embodiment, the location determination module 107 is configured to negate any phase changes introduced by the antenna 106 of the tag 102. This is done to increase the overall accuracy of the system 200. However, in many applications, the phase change introduced by the antenna 106 will not be large enough to adversely affect the location determination.

In one embodiment, the location determination module 107 is configured to determine location both from the course location estimate using signal strength and the fine location estimate using phase change. By using both determination methods, the effects of noise, interference, and multiple signal paths can be overcome. For example, using the course location estimate, a "sphere of likelihood" can first be determined. Next, the hyperboloids of the fine location estimate may only be drawn in within the sphere of likelihood, thereby reducing the computation associated with an accurate location determination.

In one embodiment, where both fine and course location determinations are used, a carrier frequency for the radio frequency signals 115, 215, 217, 219 will be selected such that the sphere of likelihood determined from the course location determination would include 3 or 4 hyperboloids. Generally speaking, lowering the carrier frequency of the radio frequency signals 115, 215, 217, 219 results in longer wavelengths, which in turn leads to hyperboloids that are father apart.

Figure 4:
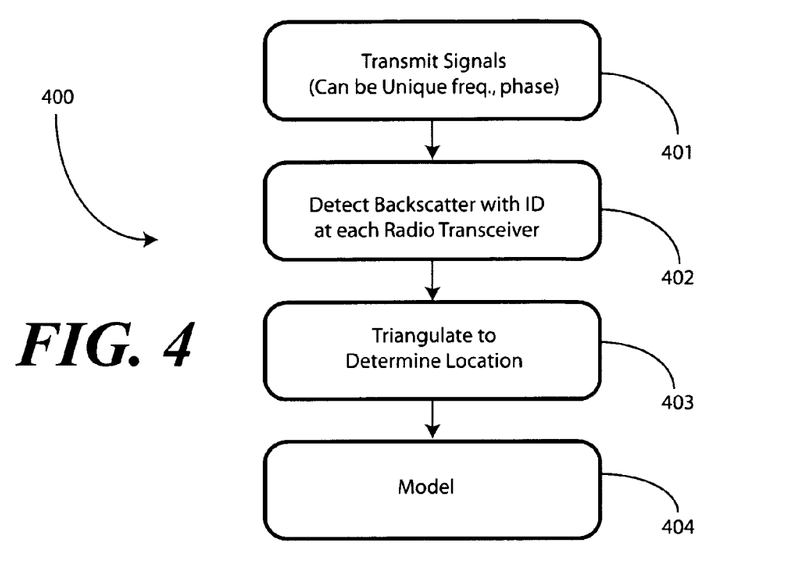
FIG. 4 illustrates one method of determining a location of an object in accordance with embodiments of the invention.

Turning now to FIG. 4, illustrated therein is one embodiment of a method 300 for determining the location of an object using reflected interferometry in accordance with embodiments of the invention. The method 400 of FIG. 4 can be configured as executable instructions to be stored in a computer readable medium, such as a memory device, for controlling the control circuit (103) and location determination module (107) to execute some or all of the functions of determining the location of an object in free-space as described herein. Alternatively, the method could be carried out by application specific hardware devices or programmable logic as well.

At step 401, a plurality of radio frequency signals are transmitted from a plurality of radio transceivers. In one embodiment, the radio frequency signals are transmitted continuously while the method 400 is being executed, although intermittent transmission is also possible. In one embodiment, the radio frequency signals are transmitted on a one-to-one basis from each radio transceiver, such that each radio transceiver transmits one radio frequency signal. In one embodiment, four radio transceivers are used to transmit four radio frequency signals into an area of interest. The radio frequency signals can each be unique. For example, in one embodiment, each radio frequency signal is transmitted with one of a unique frequency, a unique phase shift, or combinations thereof.

Figure 7:
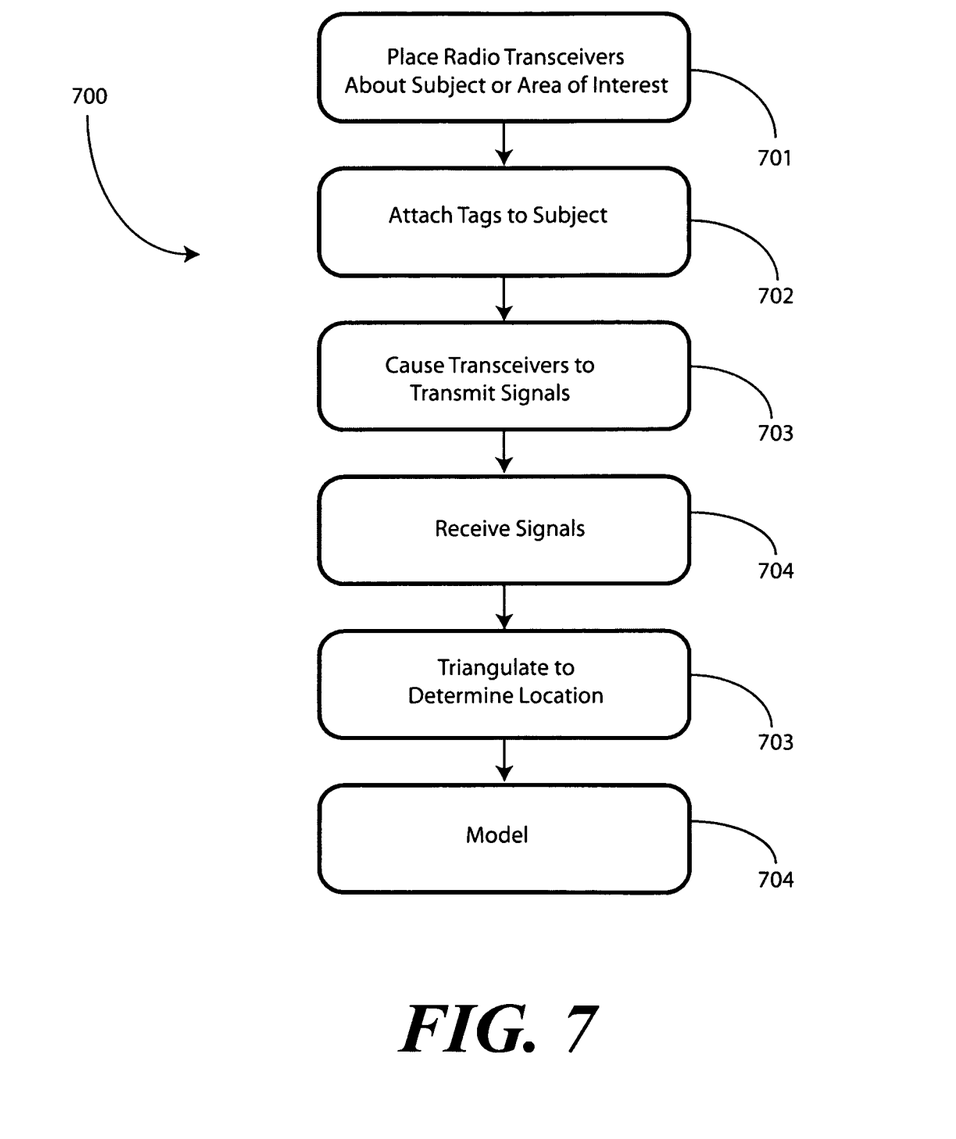
FIG. 7 illustrates one embodiment of a method suitable for use with applications such as that shown in FIG. 6.

At step 402, each radio transceiver receives one or more backscattered return signals from one or more tags. An example of a tag suitable for reflecting the one or more backscattered return signals is shown in FIGS. 7 and 8 below. As described above, each tag has a switch capable of selectively reflecting and modulating each of the transmitted radio frequency signals to encode an identifier that is unique to the tag therein. In one embodiment, the switch toggles between a high impedance load and a low impedance load in accordance with a unique identification code to modulate the identifier into the radio frequency signal and reflect and return it to the plurality of transceivers as one or more backscattered return signals.

Figure 5:
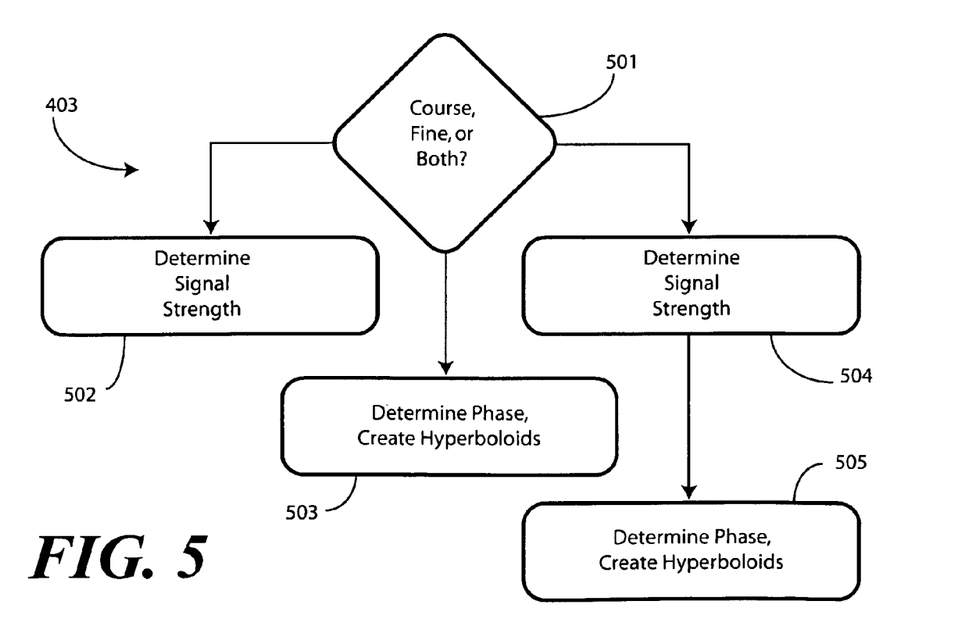
FIG. 5 illustrates one method of determining a location of an object in accordance with embodiments of the invention.

At step 403, the method 400 determines the location of the one or more tags from information derived from the one or more backscattered return signals. For example, in one embodiment, the method 400 uses triangulation techniques to determine the location of the one or more tags at step 403. As shown in FIG. 5, the location determination technique of step 403 can be accomplished in a variety of ways. Specifically, as determined at decision 501, the location determination step can include a course location determination at step 502, a fine location determination at step 503, or a combination of the two as shown in steps 504 and 505.

At step 502 and step 504, as described above, the triangulation can be performed using the relative signal strengths of the one or more backscattered signals to achieve a coarse location estimate. The signal strength of the backscattered signal can be compared to the signal strength of the transmitted radio frequency signal. As each radio transceiver determines a different relative signal strength, these differences can be triangulated to obtain a course location estimate.

At step 503 and step 505, as also described above, triangulation could be performed by generating a series of hyperboloids modeling the distances between each radio transceiver and each tag to achieve a fine location estimate, where those distances are determined from a phase shift detected between each transmitted radio frequency signal and the corresponding backscattered return signal. The phase difference of the backscattered return signal, when compared to the transmitted radio frequency signal, can be used to generate the hyperboloids. The combination of the two approaches can also be used as illustrated at steps 504,505. One example of this is the method using the course location estimate to determine a sphere of probability with the fine location estimate pinpointing the actual location of a tag within the sphere noted above.

Where multiple tags are used, it can sometimes be advantageous to model the shape of the object to which the tags are affixed. For example, embodiments of the invention are well suited for biomechanical sensing, such as athletic training, as many tags can be coupled to a student executing a biometric motion. As the radio transceivers of embodiments of the present invention are capable of determining the locations of each tag while the biometric motion is being executed, it can be useful to form a visual model of the athlete by modeling surfaces between the tags to approximate the student on a video screen. Turning now back to FIG. 4, at step 404, the method uses the knowledge of the locations of all the tags to model the shape of the object to which the tags are affixed. The modeling, in one simple embodiment, may just be a linear interpolation between each tag, which is represented on a video screen by a straight line. In a more complicated embodiment, three-dimensional surfaces can be modeled between the tag locations to create a more accurate representation of the object.

Figure 6:
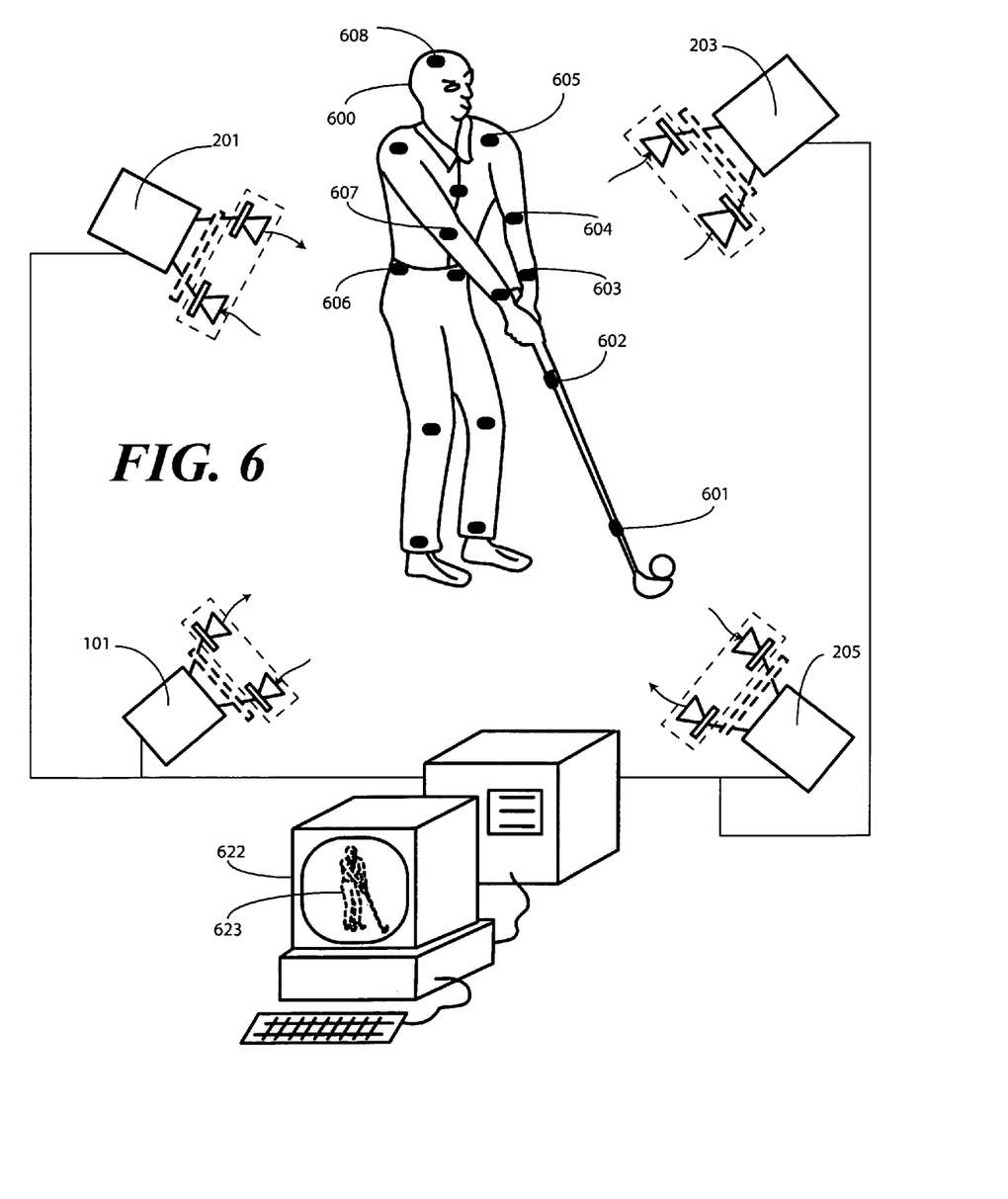
FIG. 6 illustrates an exemplary biomechanical sensing application suitable for use with methods and apparatuses in accordance with embodiments of the invention.

Turning now to FIG. 6, illustrated therein is one application well suited for embodiments of the invention. A golfer 600 is addressing a ball. The golfer 600 has a plurality of tags 601,602,603,604,605,606,607,608 affixed both along his person and on the club. As noted above, a large number of tags can be used with embodiments of the invention. Further, the tags can be constructed with very small form factors and with very little weight so as not to interfere with the golfer's swing.

In the illustrative embodiment of FIG. 6, two tags 601,602 are affixed to the club so as to monitor the location of the club in free space during the swing. Other tags 603,604, 605,606,607,608 are affixed to the golfer's body so as to monitor the golfer's knees, hips, shoulders, arms, and head during the swing. Four radio transceivers 101,201,203,205 are disposed about the golfer 600, with outputs coupled to a computer 622. The computer 622 is equipped with the location determination module (107) and object modeling module (109).

When the golfer 600 swings, the location determination module (107) determines the location of each tag continuously during the swing. The locations at different intervals of time can then be stored in memory in the computer 622. The object modeling module 109 can construct multi-dimensional models 623 of the golfer's body to display to an instructor. The instructor can then monitor both the golfer 600 and club in slow or stop motion, so as to analyze the golfer's movements and provide feedback. The computer 622 can also be equipped with instructional software to compare the golfer's motion with a benchmark, and to alert the golfer 600 when his swing deviates by a predetermined amount from a standard.

Turning now to FIG. 7, illustrated therein is a method 700 of biomechanical sensing using embodiments of the invention. The method 700 is suitable for use with the athletic training system of FIG. 6, as well as with a variety of other ergonomic activities, such as physical therapy.

At step 701, a plurality of radio transceivers are placed about the subject. In one embodiment, at least four radio transceivers will be disposed about the subject at relatively equal distances from each other. At step 702, a plurality of tags are affixed to the subject, which in a biomechanical sensing application will be a living organism or things attached to or held by the living organism.

At step 703, radio frequency signals are transmitted from the radio transceivers. At step 704, each transceiver receives one or more return signals that have been backscattered by the tags, with each return signal including a modulated identifier corresponding to one tag therein. At step 705, the location of each tag can be triangulated using either course or fine location estimation as described above. At step 706, the living organism can be modeled using the techniques described above.

As described herein, embodiments of the invention offer numerous advantages over prior art solutions. First, as described above, fine location estimates provide highly accurate, sub-centimeter location determination. Second, embodiments of the present invention use backscattered signals, thereby obviating the need for "line of sight" signal transmission. Next, the tags described herein can be manufactured inexpensively, with a light-weight, small, physical form factor. Additionally, the systems described herein can be scaled to determine location equally well in very small (such as a few square meters) areas of interest and very large (such as hundreds of square meters) areas of interest.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A reflected interferometry system for determining a location of an object in free space, comprising:
    a plurality of radio frequency transceivers;
    a location determination module coupled the plurality of radio frequency transceivers; and
    one or more tags, each of the one or more tags comprising:
        an antenna;
        a controller; and
        a switch, responsive to the controller, and operative to change a radar cross section of each antenna of the one or more tags by selectively altering a load impedance of the each antenna;
    wherein each of the plurality of radio frequency transceivers is configured to transmit one radio frequency signal and receive multi-path backscattered return signals from each of the one or more tags, each of the multi-path backscattered return signals having a unique identifier corresponding to one of the one or more tags modulated therein due to the controller switching the switch;
    wherein the location determination module is configured to determine the location of each of the one or more tags by determining a phase shift between the one radio frequency signal and the each of the multi-path backscattered return signals at each transceiver.

2. The reflected interferometry system of claim 1, wherein the location determination module is further configured to determine the location of each of the one or more tags by determining a signal strength of the each of the multi-path backscattered return signals received by the each transceiver.

3. The reflected interferometry system of claim 2, wherein the location determination module is configured to determine a first location determination for each of the one or more tags by triangulation using the signal strength of the each of the multi-path backscattered return signals received by the each transceiver.

4. The reflected interferometry system of claim 3, wherein the location determination module is configured to determine a second location determination for each of the one or more tags by triangulation using the phase shift between the one radio frequency signal and the each of the multi-path backscattered return signals at the each transceiver.

5. The reflected interferometry system of claim 2, further comprising an object modeling module configured to model a shape of the object from the determined the location of a plurality of tags.

6. The reflected interferometry system of claim 1, wherein each of the plurality of radio frequency transceivers is configured to transmit the one radio frequency signal such that it is one of frequency offset or phase offset with respect to radio frequency signals transmitted by other radio frequency transceivers.

7. The reflected interferometry system of claim 1, wherein the one radio frequency signal has a center frequency of one of about 915 MHz, about 2.45 GHz, or about 5.7 GHz.

8. The reflected interferometry system of claim 1, wherein each transceiver comprises a filter configured to pass backscatter return signals having the unique identifier modulated therein and block return signals not having the unique identifier modulated therein.

9. The reflected interferometry system of claim 1, wherein each of the one or more tags further comprises at least two loads coupled to the each antenna, wherein the switch is operative to change the radar cross section of each of the one or more tags by switching between the at least two loads.

10. The reflected interferometry system of claim 9, wherein a first load comprises a substantially open circuit and a second load comprises a substantially short circuit.

11. The reflected interferometry system of claim 10, wherein the controller is configured, upon receiving the one radio frequency signal, to encode the unique identifier by switching the switch between the substantially open circuit and the substantially short circuit.

12. The reflected interferometry system of claim 11, wherein the antenna comprises a slot antenna configured at least to receive the one radio frequency signal.

13. A method of determining a location of an object, comprising:
    transmitting a plurality of radio frequency signals from a plurality of transceivers;
    receiving, at each of the plurality of transceivers, multi-path backscattered return signals from one or more tags, each of the one or more tags having a switch capable of selectively modulate each of the plurality of radio frequency signals to encode a unique identifier therein; and
    triangulating the each of the one or more tags using the multi-path backscattered return signals.

14. The method of claim 13, further comprising determining one of a phase shift between each of the plurality of radio frequency signals and at least one of the multi-path backscattered return signals, a signal strength of at least one of the multi-path backscattered return signals, or combinations thereof at each of the plurality of transceivers, wherein the triangulating comprises comparing one or more of the phase shift between each of the plurality of radio frequency signals and the at least one of the multi-path backscattered return signals, the signal strength of the at least one of the multi-path backscattered return signals, or the combinations thereof to obtain a location determination for each of the one or more tags.

15. The method of claim 13, wherein the transmitting comprises continuously transmitting the plurality of radio frequency signals.

16. The method of claim 13, wherein the transmitting comprises transmitting each of the plurality of radio frequency signals with one of a unique frequency, a unique phase shift, or combinations thereof.

17. The method of claim 13, wherein the triangulating comprises generating a plurality of model hyperboloids based upon a phase shift between each of the plurality of radio frequency signals and at least one of the multi-path backscattered return signals and determining where the plurality of model hyperboloids intersect.

18. The method of claim 13, further comprising determining a shape of the object by modeling the shape of the object from a location determination for a plurality of tags.

19. A method of biomechanical sensing, comprising:
- coupling a plurality of tags to a living organism, wherein each tag comprises a switch operative to change a radar cross section of each of the plurality of tags from a radio frequency reflective state to a radio frequency non-reflective state by selectively altering an impedance of an antenna;
- disposing a plurality of transceivers about the living organism;
- transmitting a radio frequency signal from each of the plurality of transceivers;
- receiving, at each of the plurality of transceivers, a plurality of multi-path backscattered return signals from the plurality of tags, each multi-path backscattered return signal having a unique identifier modulated therein by each switch of the each tag; and
- triangulating a location of each of the plurality of tags from the plurality of multi-path backscattered return signals.

20. The method of claim 19, further comprising modeling a geometric orientation of the living organism from the location of each of the plurality of tags.

* * * * *